US009800831B2

(12) United States Patent  
Diao

(10) Patent No.: US 9,800,831 B2  
(45) Date of Patent: Oct. 24, 2017

(54) CONVEYING ATTENTION INFORMATION IN VIRTUAL CONFERENCE

(71) Applicant: Jie Diao, Fremont, CA (US)

(72) Inventor: Jie Diao, Fremont, CA (US)

( * ) Notice: Subject to any disclaimer, the term of this patent is extended or adjusted under 35 U.S.C. 154(b) by 0 days.

(21) Appl. No.: 15/186,316

(22) Filed: Jun. 17, 2016

(65) Prior Publication Data

US 2016/0373691 A1    Dec. 22, 2016

Related U.S. Application Data

(60) Provisional application No. 62/181,693, filed on Jun. 18, 2015.

(51) Int. Cl.
| | |
|---|---|
| *H04N 7/15* | (2006.01) |
| *H04N 7/14* | (2006.01) |
| *G06F 3/0484* | (2013.01) |
| *H04L 12/18* | (2006.01) |
| *H04M 3/56* | (2006.01) |

(52) U.S. Cl.
CPC ......... *H04N 7/147* (2013.01); *G06F 3/04842* (2013.01); *H04L 12/1813* (2013.01); *H04M 3/567* (2013.01); *H04N 7/157* (2013.01)

(58) Field of Classification Search
CPC   H04N 7/14; H04N 7/147; H04N 7/15; H04N 7/152
USPC ........................................... 348/14.01–14.16
See application file for complete search history.

(56) References Cited

U.S. PATENT DOCUMENTS

2010/0064010 A1    3/2010  Alkov et al.
2012/0204120 A1*   8/2012  Lefar ................... G06Q 10/109
                                                    715/757
2012/0306993 A1   12/2012  Sellers-Blais
2013/0088563 A1*   4/2013  Wu ...................... H04L 12/1822
                                                    348/14.07
2013/0271560 A1*  10/2013  Diao ........................ H04N 7/15
                                                    348/14.08
2014/0298210 A1*  10/2014  Park ...................... G06F 3/0486
                                                    715/758
2015/0074556 A1*   3/2015  Bader-Natal ........... H04N 7/152
                                                    715/753

FOREIGN PATENT DOCUMENTS

KR    10-2009-0063608 A    6/2009

OTHER PUBLICATIONS

PCTUS2016038237 International Search Report dated Sep. 1, 2016 (3 pages).

\* cited by examiner

*Primary Examiner* — Melur Ramakrishnaiah

(74) *Attorney, Agent, or Firm* — Innovation Counsel LLP

(57) ABSTRACT

A method of executing a virtual conference among a plurality of nodes including a first node, wherein there is a display device associated with the first node that is configured to display a virtual conference window containing images of participants at other nodes of the plurality of nodes, is presented. The method entails activating the virtual conference window in response to receiving a selection in the virtual conference window, wherein the activating of the virtual conference window triggers a process of identifying one of the nodes as an attention recipient and displaying the attention recipient's image differently than images of other nodes. Where private chat function is available, attention recipient may be identified based on who the participant at the first node is chatting with. Images may be augmented to add an illusion of space and distance.

12 Claims, 16 Drawing Sheets

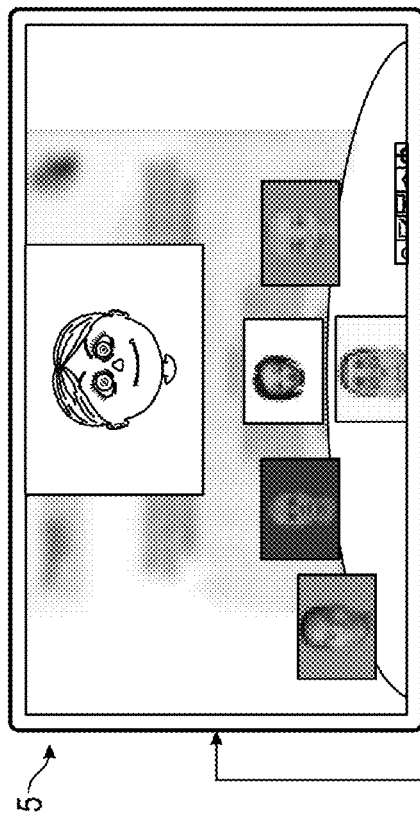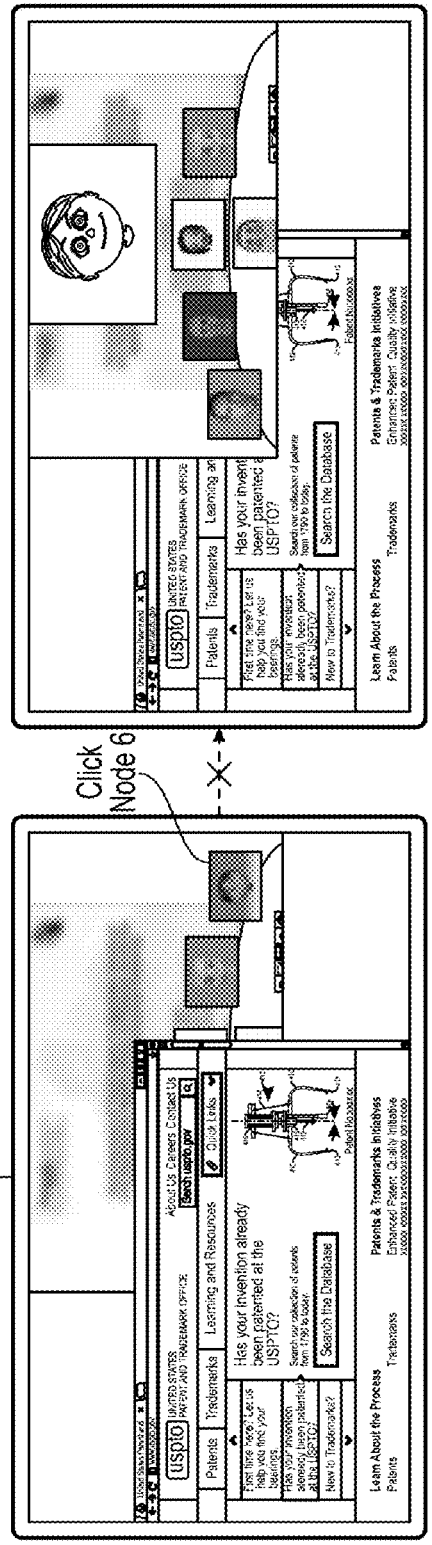
FIG. 4B

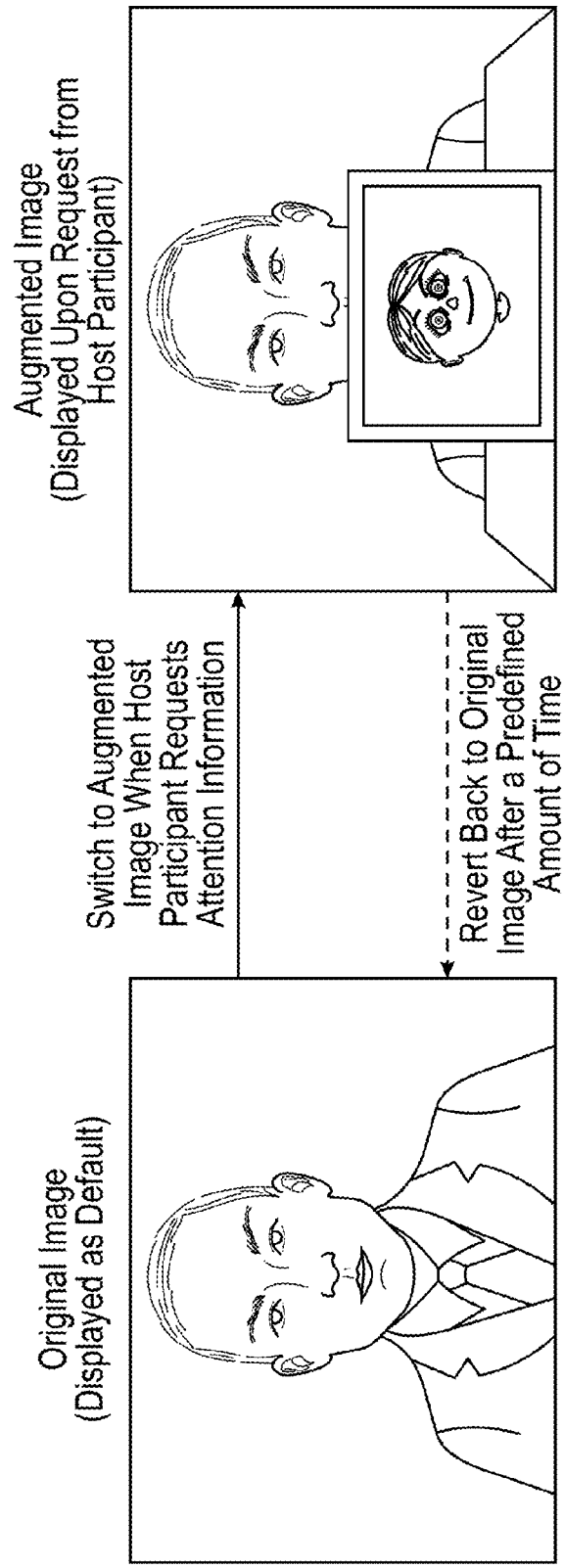

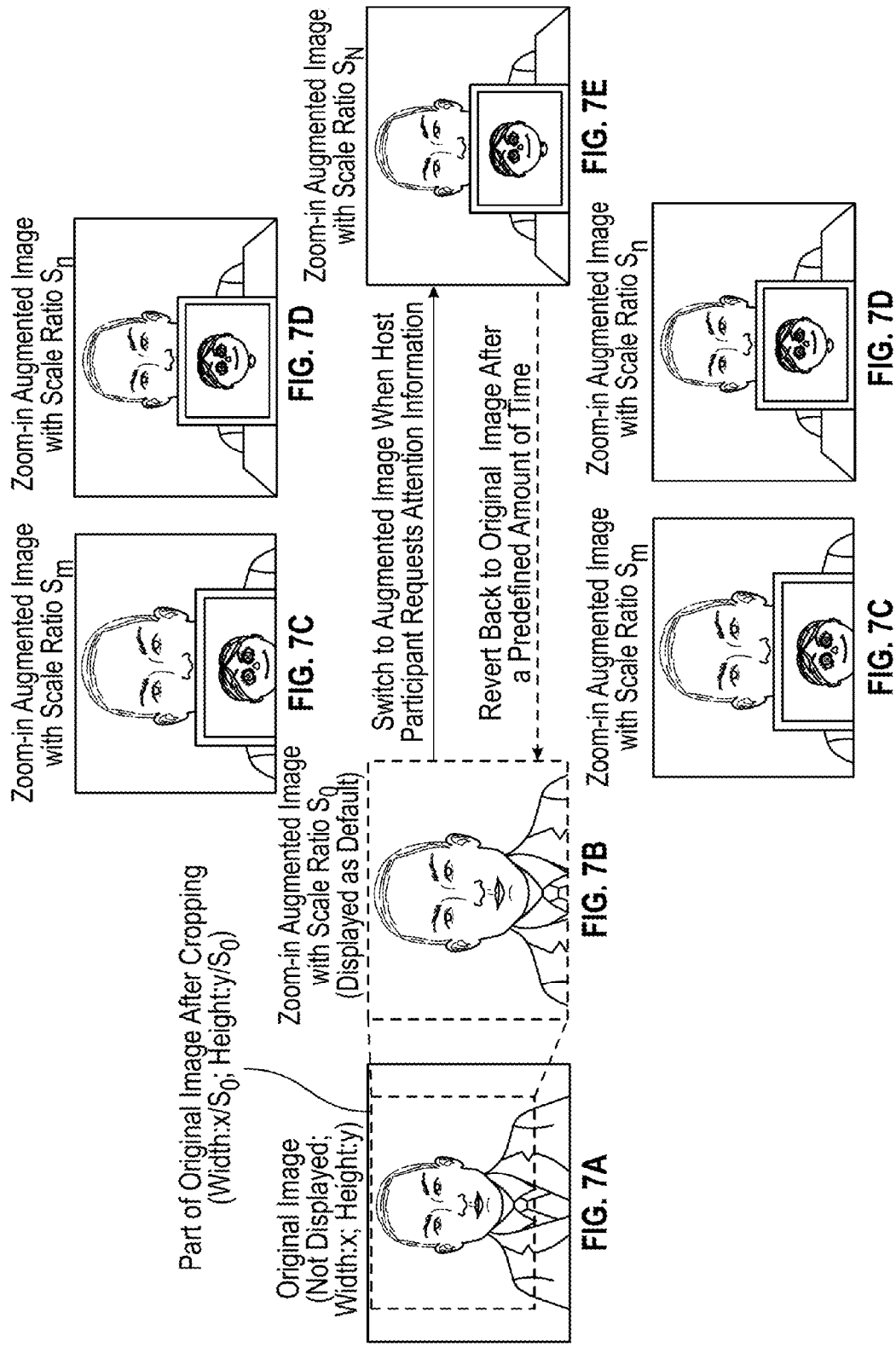

A Private Chat Message is Received

A Public Chat Message is Received

CONVEYING ATTENTION INFORMATION IN VIRTUAL CONFERENCE

RELATED APPLICATION(S)

This application claims priority to and benefit of U.S. Provisional Patent Application No. 62/181,693 filed on Jun. 18, 2015, the content of which is incorporated by reference herein in its entirety.

RELATED FIELD

The present disclosure relates generally to virtual conferencing and more particularly to virtual conferencing capable of conveying attention information.

BACKGROUND

Virtual conferencing in the form of video conferencing has become widely available in the past decade. Video conferencing provides a convenient way for participants to "meet" without traveling to be physically together. In addition to saving time and cost associated with traveling, video conferencing is environmentally friendly, as it should help avoid unnecessary driving and flying. In spite of the above advantages, video conferencing is under-utilized today and people still travel distances for face-to-face meetings. This is because many people find video conferencing to be a poor substitute for face-to-face meetings.

One of the reasons video conferencing is unsatisfactory is the loss of attention information. Conference participants like knowing who is focusing attention on whom or what and if anyone is focusing attention on them, and lack of these information makes video conferencing impersonal, uncomfortable, and ineffective for many people. Moreover, absence of attention information can even lead to miscommunication. For example, in a video conference with multiple people, it is sometimes difficult to tell exactly whom the speaker is talking to. When the speaker asks, "Could you handle that?" at the end of a long job description, multiple people could assume that they are each being asked to handle the job because all of them assume that they are getting the attention of the speaker although the speaker may only focus attention on one of them. The possibility of this type of miscommunication leads people to avoid handling important communication via a video conference, forcing them to travel.

SUMMARY

A method of obtaining attention information in a virtual conference is presented. The method includes causing a virtual conference window to be displayed in a state of mono-presence in response to receiving a node selection.

In one aspect, the inventive concept pertains to a computer-implemented method of executing a virtual conference among a plurality of nodes including a first node, wherein there is a display device associated with the first node that is configured to display a virtual conference window containing images of participants at other nodes of the plurality of nodes. The method entails displaying the virtual conference window in a state of mono-presence in response to receiving a selection in the virtual conference window, wherein the displaying of the virtual conference window in a state of mono-presence triggers a process of identifying one of the nodes as an attention recipient and displaying the attention recipient's image differently than images of other nodes.

In another aspect, the inventive concept pertains to a method of obtaining attention information in a virtual conference. The method includes automatically deactivating all nodes upon deciding that a virtual conference window is no longer in a state of mono-presence.

In yet another aspect, the inventive concept pertains to a computer-implemented method of executing a virtual conference among a plurality of nodes including a first node, wherein there is a display device associated with the first node that is configured to display a virtual conference window containing images of participants at other nodes of the plurality of nodes. The method entails displaying, on the display device, a private chat window with an image of a participant that is associated with the private chat window in response to receiving, from the first node, a selection of a private chat window.

In yet another aspect, the inventive concept pertains to a method of conducting a virtual conference by augmenting an original image of a participant by changing a dimension of the original image and adding a virtual table to create an augmented image, and causing the augmented image to be displayed.

In yet another aspect, the inventive concept pertains to a computer-implemented method of conveying attention information in a virtual conference between a first participant and a second participant by displaying an image of the second participant to the first participant and, in response to a selection of the second participant by the first participant, generating a signal to indicate the attention information of the second participant.

DESCRIPTION OF THE DRAWINGS

FIGS. 4A and 4B illustrate embodiment that addresses inaccuracy of attention information when windows other than the virtual conference window compete for the host participant's attention.

FIGS. 6A and 6B depict switching from an original image to an augmented image and reverting back to the original image when the host participant requests attention information.

FIGS. 7A, 7B, 7C, 7D, and 7E depict exemplary images of an animation sequence when switching from a zoom-in original image to a zoom-in augmented image and reverting back to the zoom-in original image when the host participant requests attention information.

DETAILED DESCRIPTION

There have been numerous efforts to build virtual conferencing systems that are capable of collecting and conveying attention information to the participants. In general, those systems collect attention information by monitoring the gaze of participants, by monitoring head location and orientation of participants, or by relying upon manual selection by participants. The attention information is conveyed to participants by rotating the images of different participants toward the direction they are looking at so that a host participant can infer the gaze direction based on the rotation angle of the images, by providing the images of different participants with specific perceived gaze angles so that a host participant can infer what other participants are looking at, by connecting videos of participants and the objects they focus their attention on with dashed lines to indicate exactly where the participants are focusing their attention on, or by using visual cues such as coloring and thumbnail images to convey information about what peer participants are focusing their attention on.

As used herein, a "window" is usually a visual area containing some of the graphical user interface of the program it belongs to. A window usually has a rectangular shape that can overlap with the area of other windows. A "window," hence, is not synonymous with the entire display area. A virtual conference window is therefore a visual area containing information a virtual conference system presents at a conference terminal. A virtual conference window is considered to be in a state of "mono-presence" at a terminal if that window is in effect the only source that can visually provide information of interest in the display area of the terminal. A virtual conference window is considered to be in a state of "poly-presence" if it co-occupies the display area of the terminal with at least another window that is not part of the virtual conference and if both windows can, in effect, be sources that can visually provide information of interest. A virtual conference window is considered to be in a state of "absence" at a terminal if that window is in effect unable to visually provide information of interest, for example, if that window is minimized or is blocked by another window.

Figure 1A:
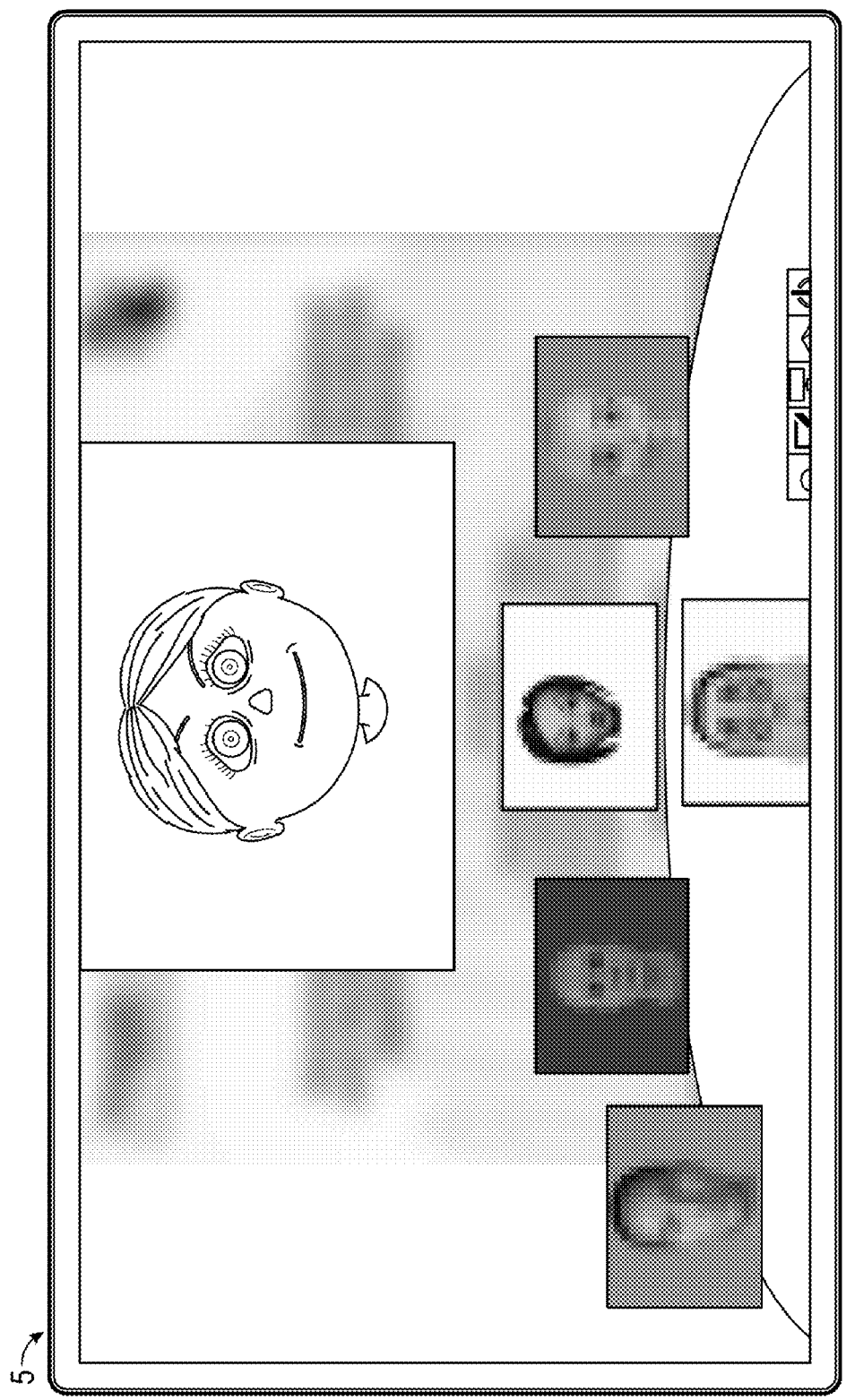
FIGS. 1A, 1B, 1C and 1D depict different states of a virtual conference window at a conference terminal.

The existing methods of collecting and conveying attention information assume that the virtual conference window is in a state of mono-presence at a terminal, that is, only virtual conference related information (for example, videos of other participants, presentation materials, white boards, conference control panels, etc.) is shown on the display device 5 at conference terminals in front of participants and the participants are "immersed" in the virtual conference without other windows at the conference terminals competing for the participants' attention (FIG. 1A). Based on this assumption of mono-presence, the system correlates participants' gaze, head rotation or manual input to what the participants are supposed to focus their attention on.

In reality, when participants are using personal computers, tablets, smartphones or other devices as conference terminals, there is no guarantee that the virtual conference window will always be in a state of mono-presence. In a first case, a participant may choose to display other windows side by side with the virtual conference window, like in FIG. 1B where a web browser window showing the homepage of USPTO is displayed side by side with the virtual conference window. A participant can browse the webpage while at the same time keeping an eye on what is happening in the virtual conference. In a second case, a participant may choose to bring another window in front and block most part of the virtual conference window so that a participant is unable to visually derive useful information from the virtual conference window, like in FIG. 1C. In a third case, a participant may choose to minimize the virtual conference window to remove it from the display area while keeping the virtual conference software running in background, like in FIG. 1D. In the first case, the virtual conference window is in a state of poly-presence; in the second and third case, the virtual conference window is in a state of absence. With windows other than the virtual conference window competing for a participant's attention, the participant may switch their attention to other software windows while leaving the virtual conference software running. If not properly designed, the virtual conferencing system may collect attention information assuming that a participant's attention is still confined within the virtual conference while in reality the participant might be focusing attention on competing windows. This disclosure describes a virtual conferencing system that can collect and convey accurate attention information when windows other than the virtual conferencing window may compete for participants' attention.

A method for conveying gaze information is disclosed. The new method manipulates video images of a peer participant to induce a host participant to infer what the peer participant is focusing his attention on.

A method for handling group chat messages and private messages to deliver more accurate attention information is also disclosed herein.

A method to signal hand raising in a virtual conference is also disclosed.

The present disclosure pertains to a method and system that collects and delivers information to participants in a virtual conference based on whom or what the participants are focusing attention on. Although the concept will be described in the context of a virtual conference, it will be understood that this is not a limitation of the disclosed method and system, and the concepts disclosed herein can be adapted to other applications, such as virtual games.

Figure 2A:
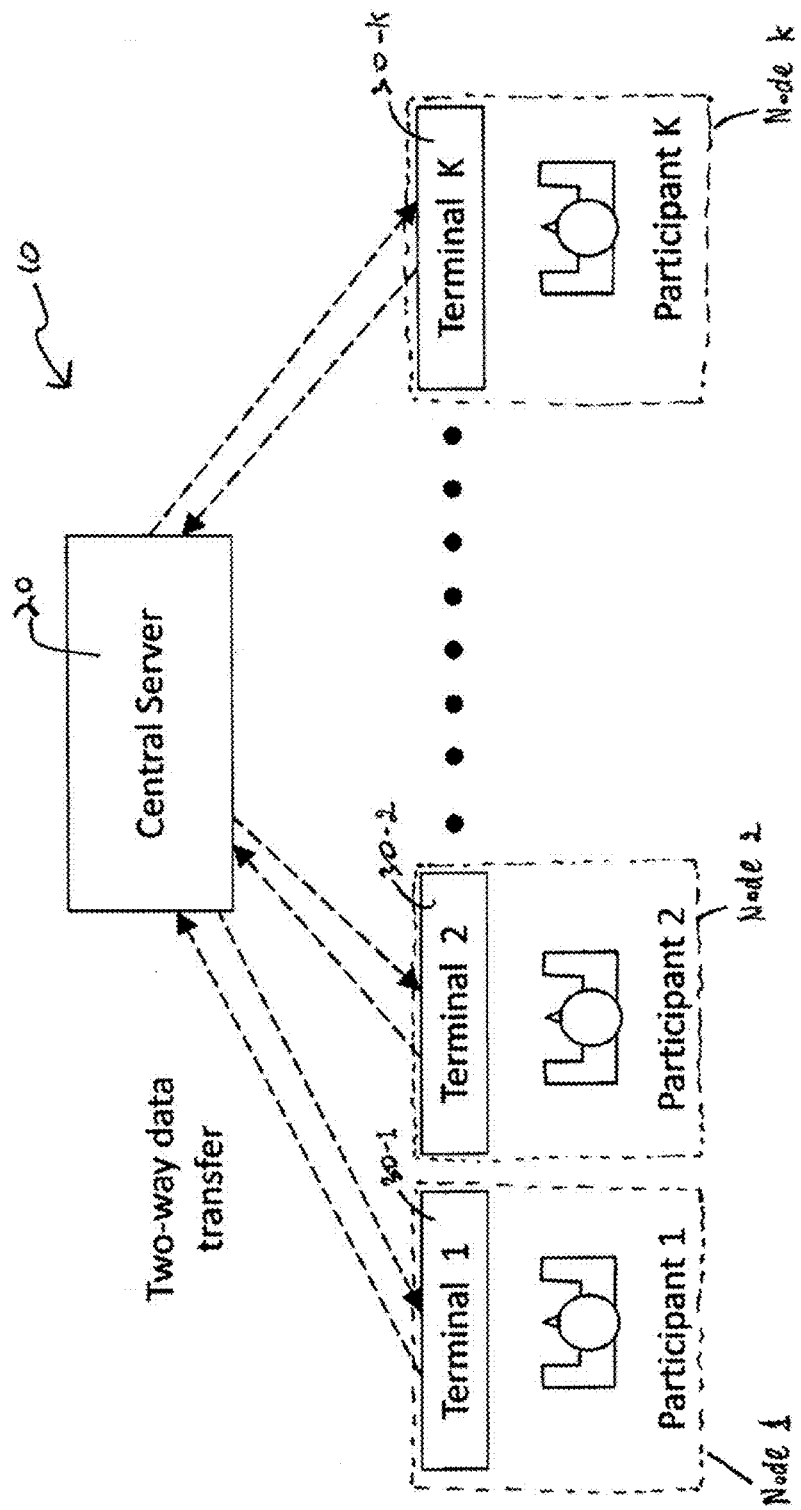
FIGS. 2A, 2B and 2C depict embodiments of a virtual conference system in accordance with the inventive concept.

FIG. 2A depicts a virtual conference system 10 of the inventive concept. A "conference", as used herein, is intended to include any type of meeting or exchange and is not limited to a formal business meeting. A "virtual conference" is intended to include any type of meeting or exchange that does not require participants to be in the same physical location, such as a video conference, screen sharing, and audio conference. As shown in FIG. 2A, the virtual conference system 10 includes a central server 20 and a plurality of terminals 30.

The central server 20 can include a web server, an enterprise server, or any other type of computer server, and can be computer programmed to accept requests (e.g., HTTP, or other protocols that can initiate data transmission) from a computing device and to serve the computing device with requested data. In addition, the central server 20 can be a broadcasting facility, such as free-to-air, cable, satellite, and other broadcasting facility, for distributing data.

The terminals 30 can include a room system, a desktop computer, a laptop, a tablet, a smartphone, or any other device capable of capturing, displaying, and transmitting visual data and audio data. Each terminal 30 is equipped with audio and video input and output devices, and each terminal 30 may have a participant. A "participant" may be a human being, a robot, a virtual cartoon figure, an inanimate object, etc. The video input/output devices at the terminals 30 allow the participants to see each other, and the audio input/output devices at the terminals 30 allow the participants to hear each other. The terminals 30 may be at remote geographical locations (e.g., different cities), although this is not a limitation of the inventive concept.

The virtual conference system 10 may include a plurality of nodes. Each terminal 30 in the virtual conference system 10 corresponds to a "node." If a "terminal 30" is followed by a number or a letter, it means that the "terminal 30" corresponds to a node sharing the same number or letter. For example, as shown in FIG. 2A, terminal 30-1 corresponds to node 1 which is associated with participant 1, and terminal 30-$k$ corresponds to node k which is associated with participant k.

A "node" is a logically independent entity in the virtual conference system 10. Therefore, the plurality of nodes in the virtual conference system 10 can represent different entities. For example, a node may be associated with a conference participant, a projection screen, a white board, an empty seat, or even an empty space. A node may also be a simulation of a virtual conference terminal from another system, thereby allowing participants using different systems to engage in a conference. A node may correspond to multiple objects. For example, a projection screen and a white board can share the same node. In such a case, a conference participant can choose whether to display the projection screen and/or white board on his terminal 30. Not every node corresponds to a terminal 30, however. For example, the white board node may be a board that is generated by the central server 20.

Referring to FIG. 2A, the bi-directional arrows between the central server 20 and each terminal 30 indicate two-way data transfer capability between the central server 20 and each terminal 30. The terminals 30 can communicate with one another via the central server 20. For example, both visual data and audio data may be transmitted to/from the terminals 30 and the central server 20, and among the terminals 30. The central server 20 collects (visual and/or audio) data from each terminal 30, and generates an appropriate custom view to present at each of the other terminals 30.

Figure 1B:
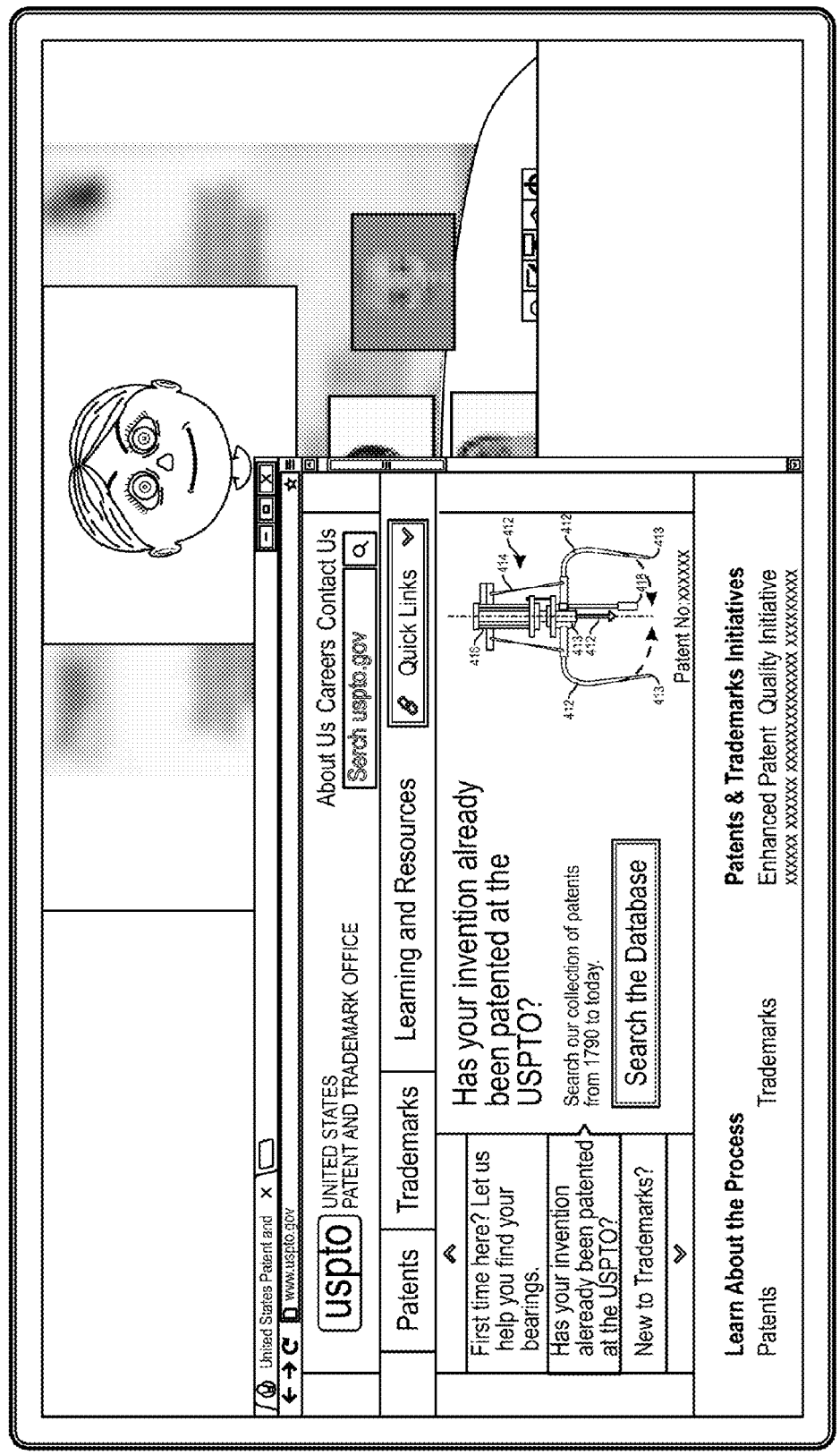
Figure 1C:
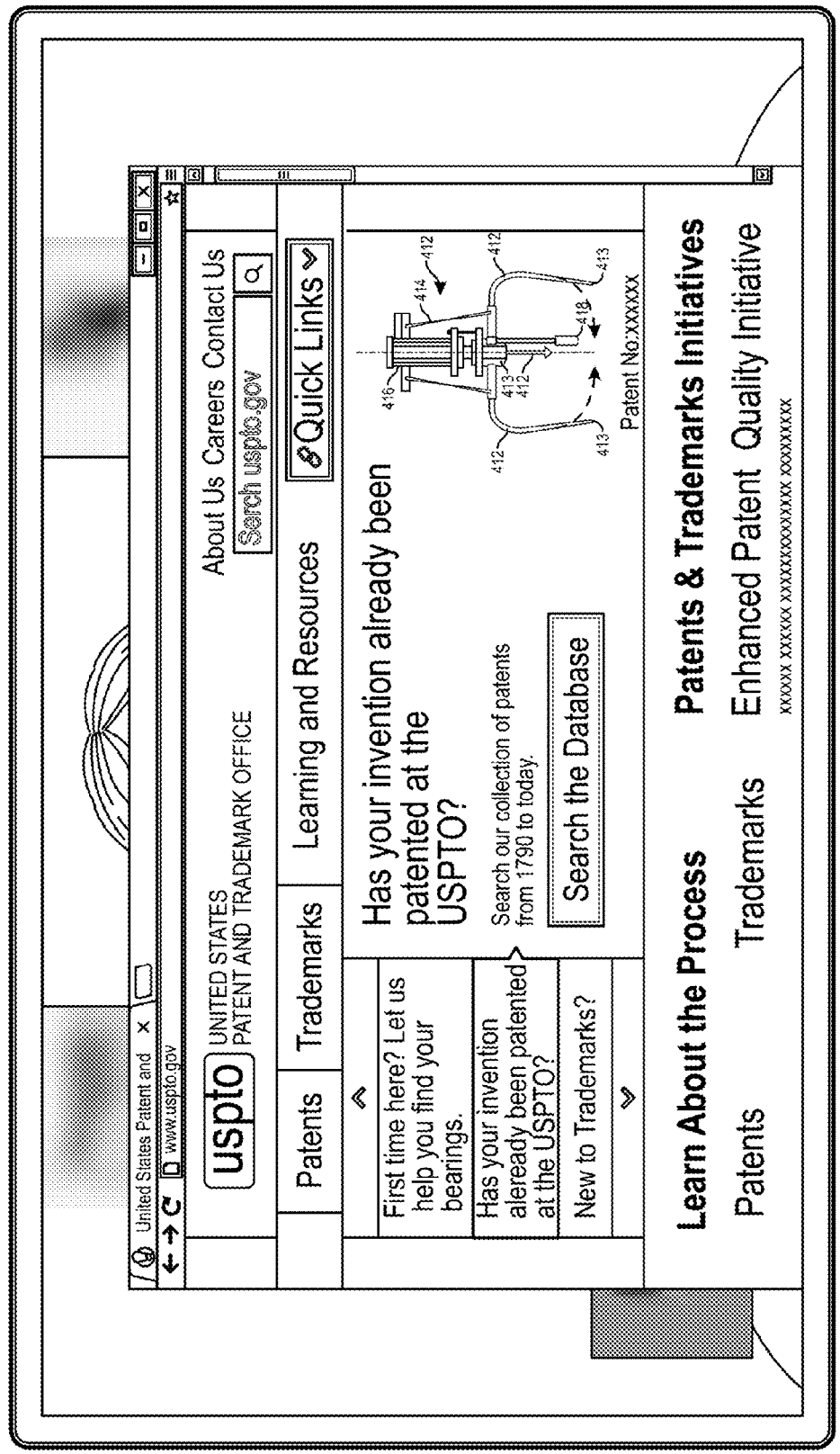
Figure 1D:
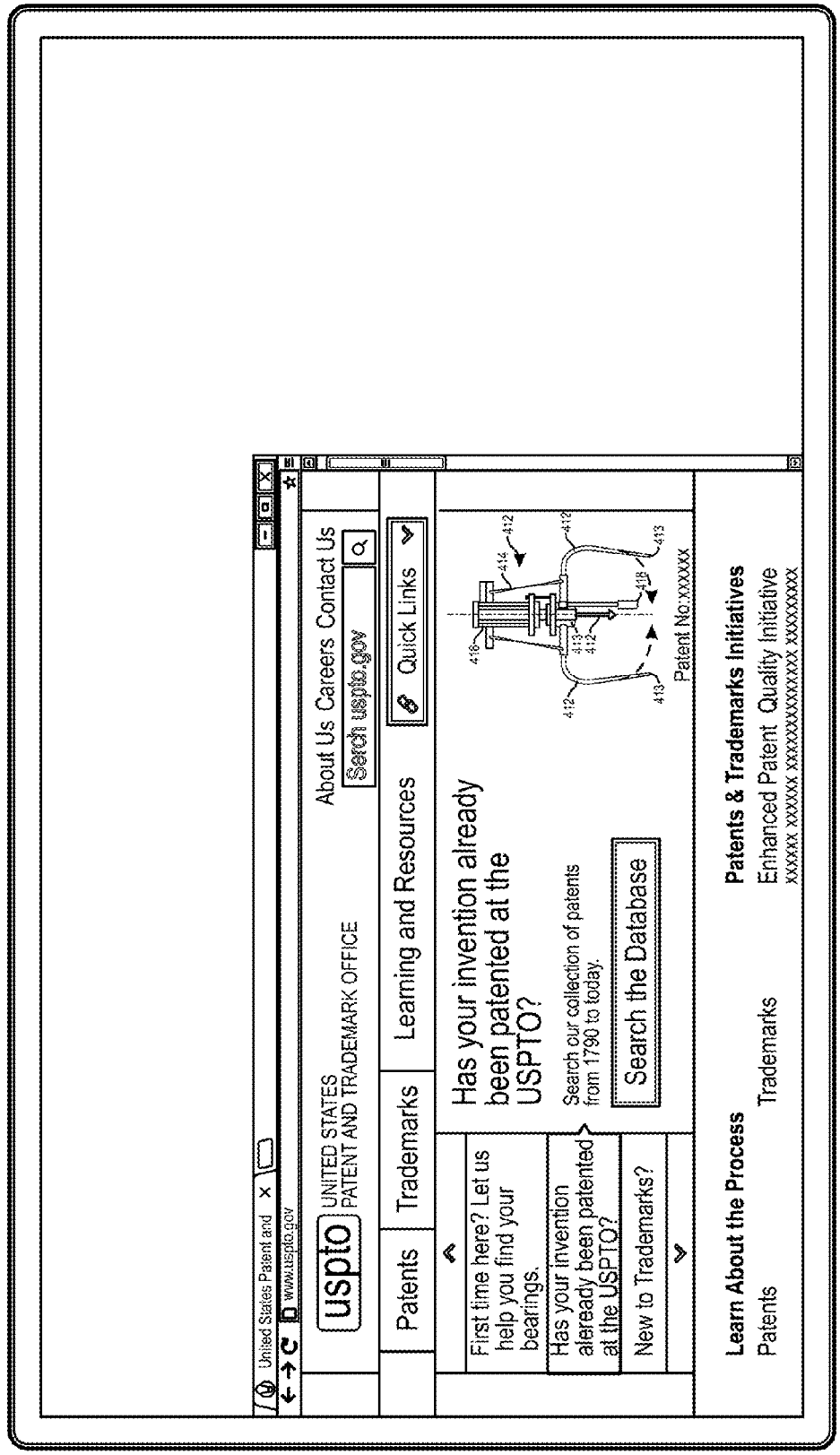
Figure 2B:
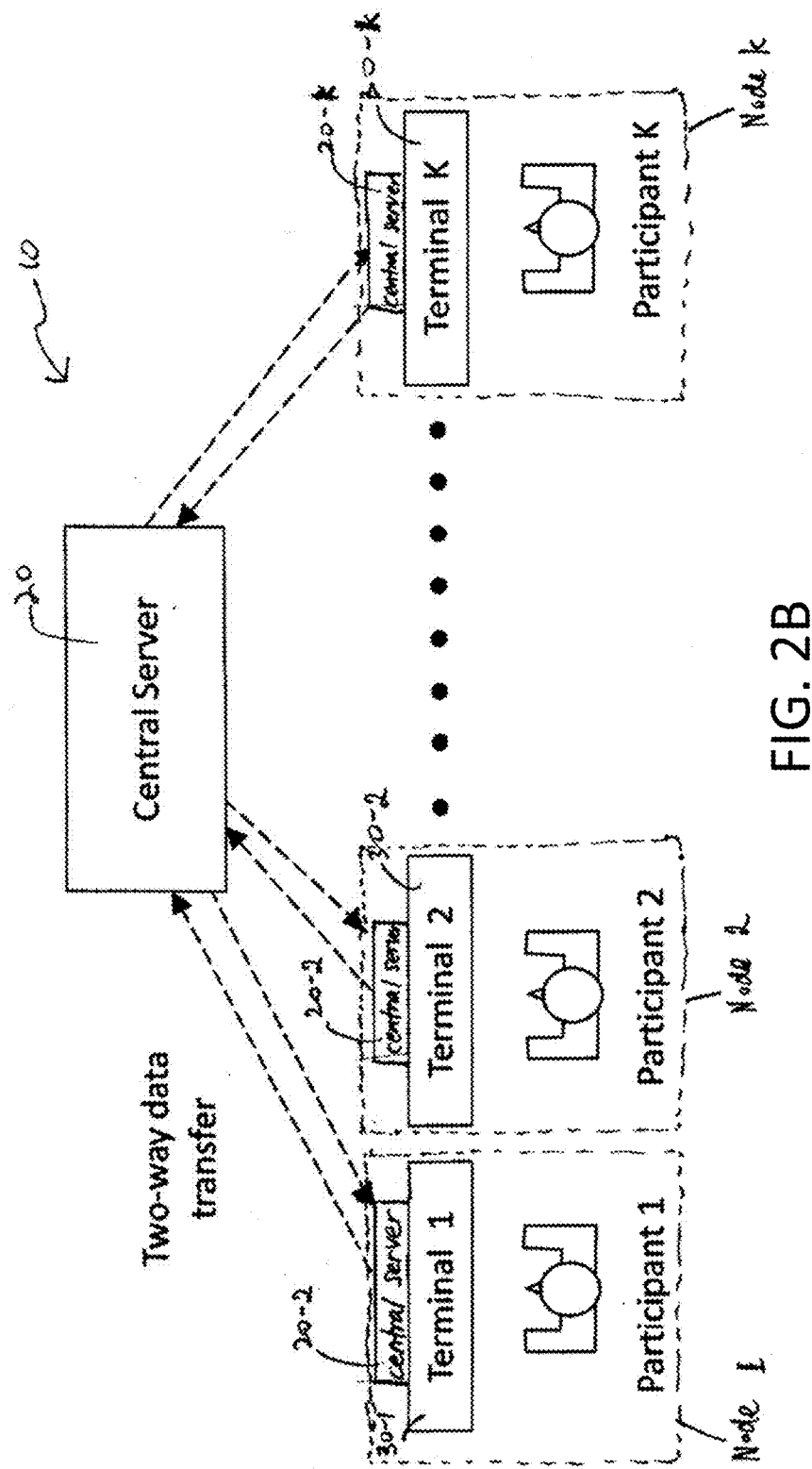

FIG. 2B is another embodiment of the virtual conference system 10, and illustrates that the central server 20 does not have to be one physical unit at one location. The central server 20 is defined by its processing capability, and can thus be partially remote to the terminals 30 and partially located at the terminals 30. For example, as shown in FIG. 1B, the system 10 can further include a plurality of central servers (20-1, 20-2, . . . , 20-$k$) located at respective terminals (30-1, 30-2, . . . , 30-$k$), in addition to a central server 20.

Figure 2C:
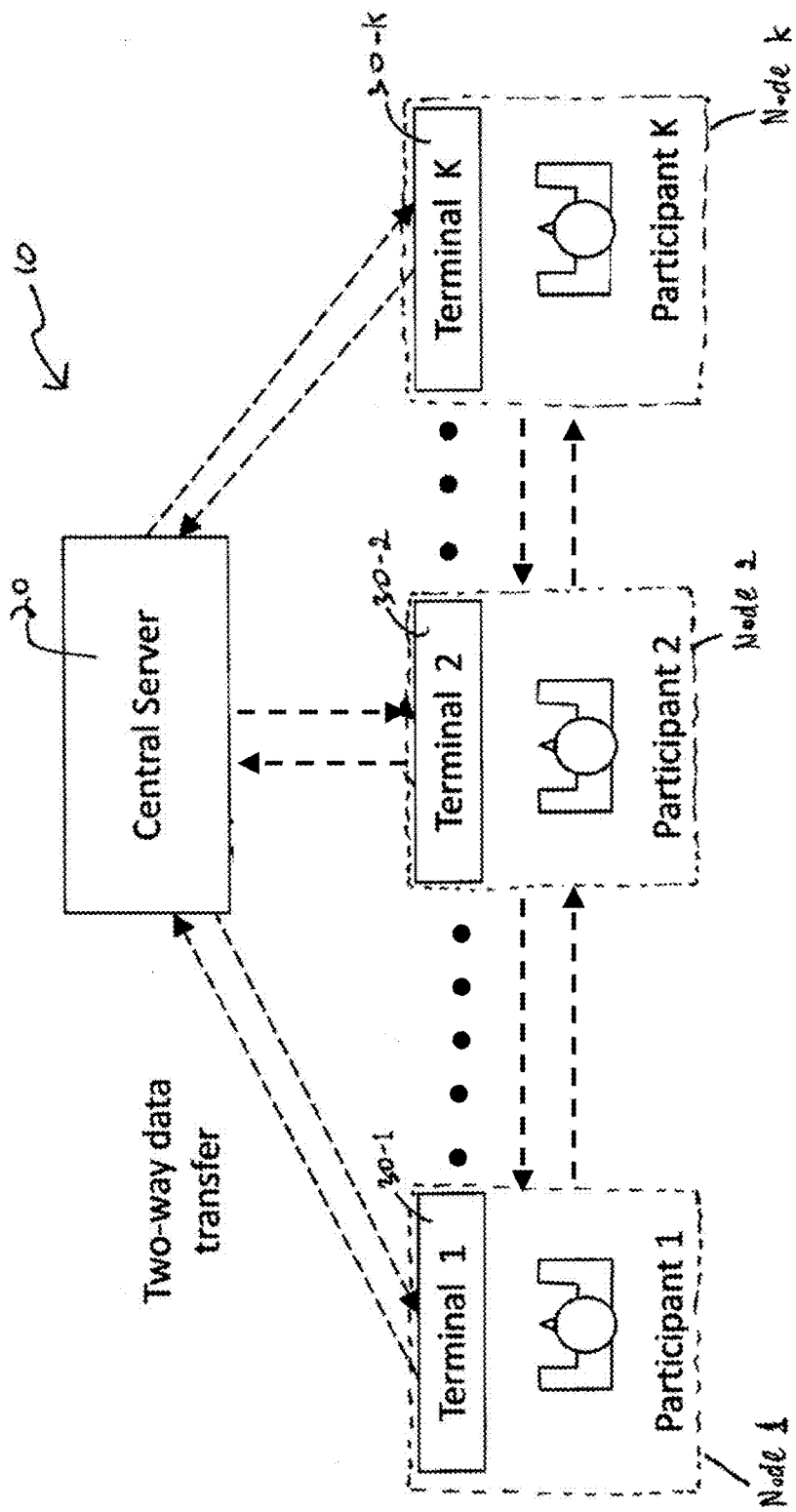

FIG. 2C is yet another embodiment of the virtual conference system 10. Unlike the embodiments of FIG. 2A and FIG. 2B, which employ a client-server architecture, the embodiment of FIG. 1C employs a peer-to-peer communication channel by which terminals 30 can directly communicate without passing through the central server 20. The peer-to-peer communication channel helps reduce the load on the central server 20 by utilizing the resources (e.g., bandwidth, storage space, processing power) of the network participants (terminals 30). Although not explicitly shown, the peer-to-peer communication channel may be added to the embodiment of FIG. 2B where the central server 20 is not in one location. The peer-to-peer channel may be especially useful in certain situations, such as in a two-participant conference where the active node is constant.

Improving Accuracy of Attention Information when Competing Windows Exist

The inventive concept disclosed herein pertains to a system that is capable of collecting accurate attention information from participants. The system presents each participant with the option of focusing attention on one of the nodes or choosing to focus attention on nothing. More specifically, the system presents the nodes at a low image quality except the active node, if any is selected. If a participant selects an active node, the active node is displayed at a high image quality while the rest of the nodes remain displayed at a low image quality. As used herein, a "high image quality" has characteristics that are intended to draw a participant's attention, for example by being presented in one or more of low noise level, high resolution, color, high sharpness, high brightness and high frame rate. A video or image at a high image quality just need to provide enough visual details for an ordinary person to justify the effort to focus attention on it. For example, a presentation slide is considered to be at a high image quality as long as pictures and texts in the slide are reasonably legible. A video of a participant from a web camera is considered to be at a high image quality as long as the facial features of the participant are reasonably recognizable and the body motions are reasonably smooth. A "low image quality," in contrast, has characteristics that are intended to discourage a participant from looking at an image, for example by being presented in one or more of high noise level, low resolution, black and white or dull colors, low sharpness, low brightness and low frame rate. A video or image at a low image quality would induce an ordinary person to ignore it. For example, a blurred image of a presentation slide is considered to be at a low image quality if an ordinary person can hardly tell what's in the slide. A black and white low resolution thumbnail image of a participant that is refreshed every 5 seconds is considered to be at a low image quality. In one embodiment, the "high image quality" may be the standard image quality that applies to all the windows. In such an embodiment, an active change would be applied to convert some of the images to "a low image quality" that is different from the image quality that would automatically apply to a standard open window.

No more than one node can be selected as the active node at a given time. This way, the system (e.g., the central server 20) is able to monitor whom each participant is focusing attention on at a given time, in real time.

Figure 3A:
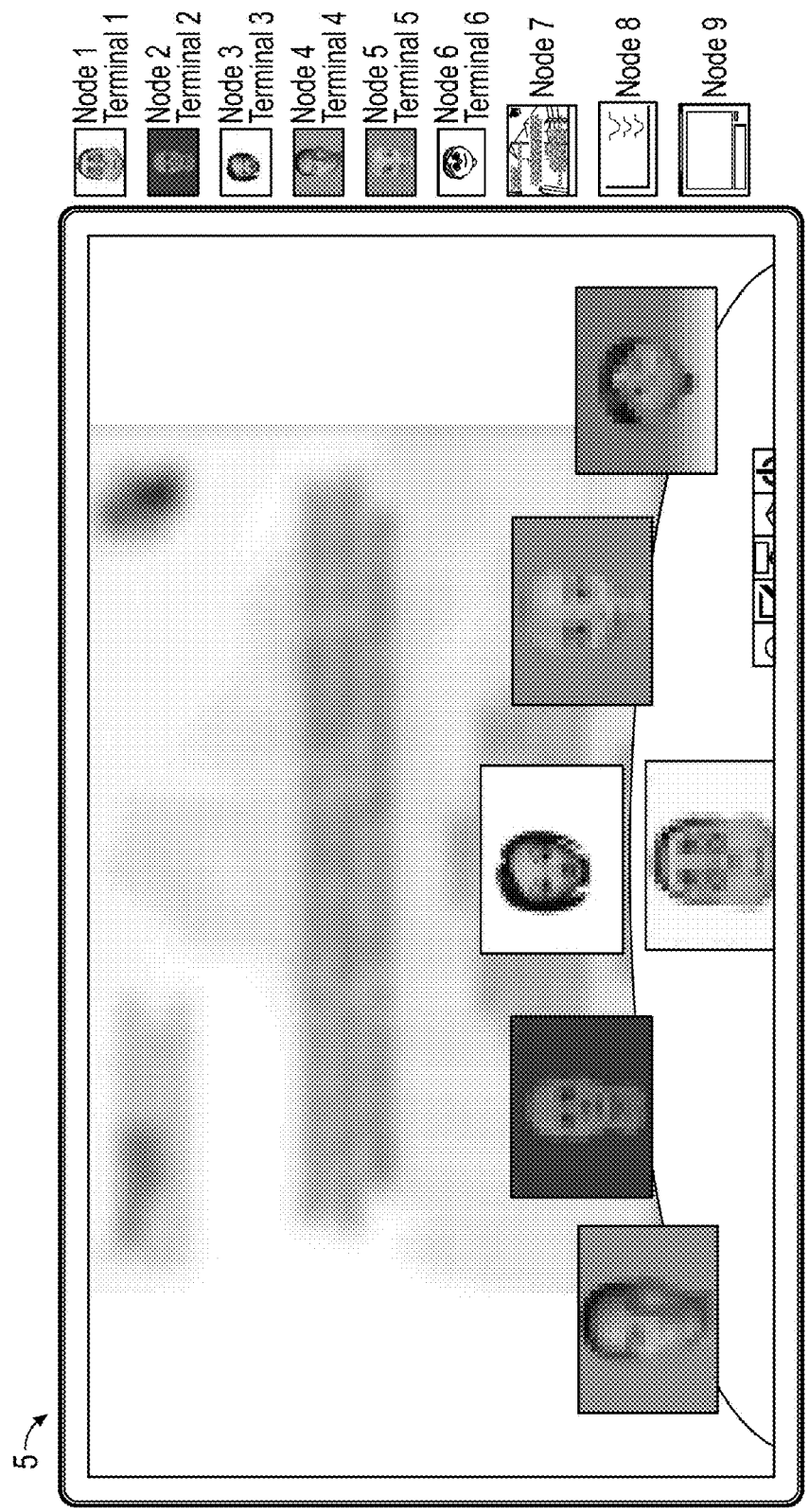
FIGS. 3A, 3B and 3C depict exemplary views that are displayed at terminal 30-1 when participant 1 selects no node as active node, selects node 6 as active node and selects node 7 as active node, respectively.
Figure 3B:
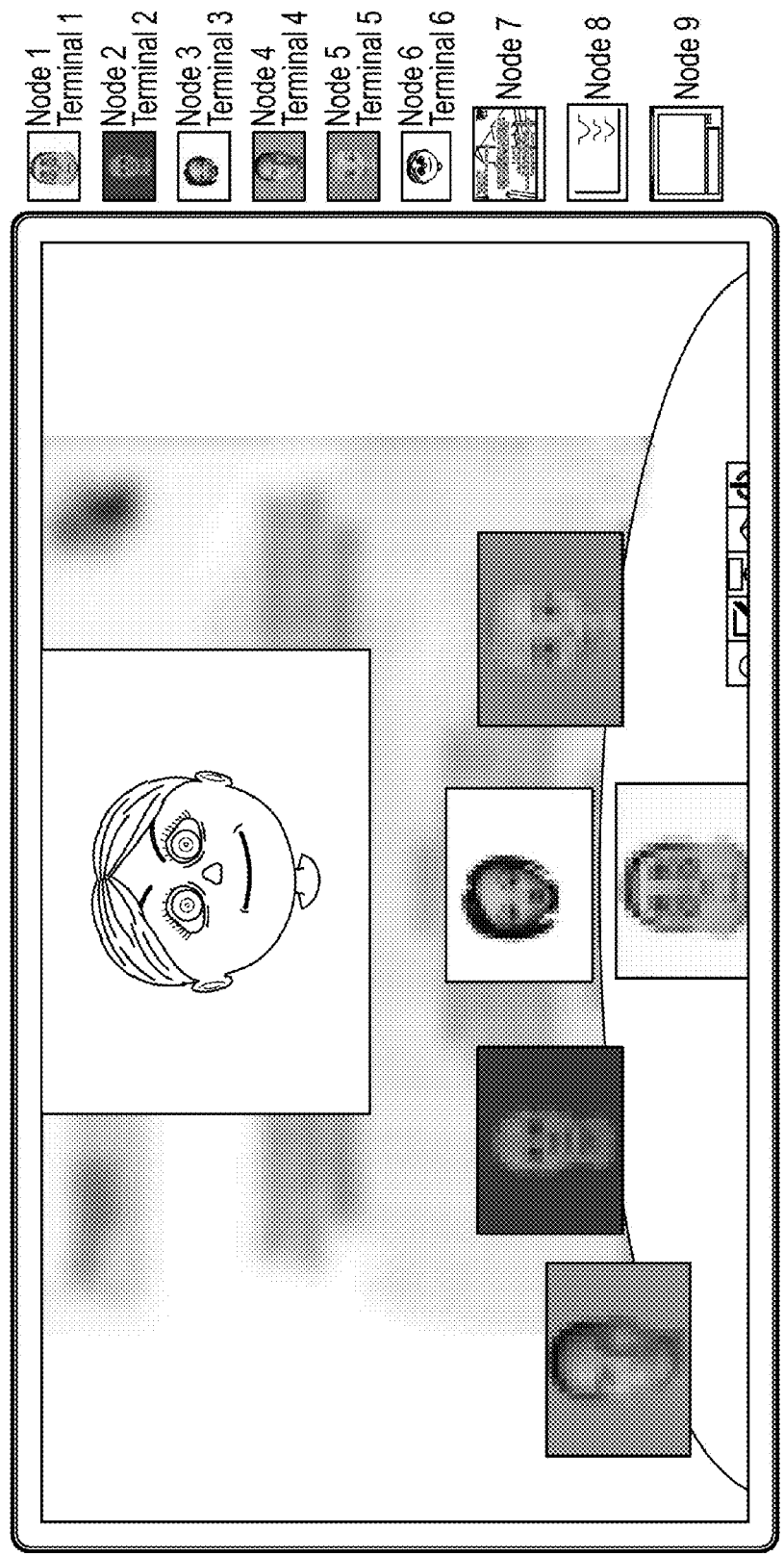
Figure 3C:
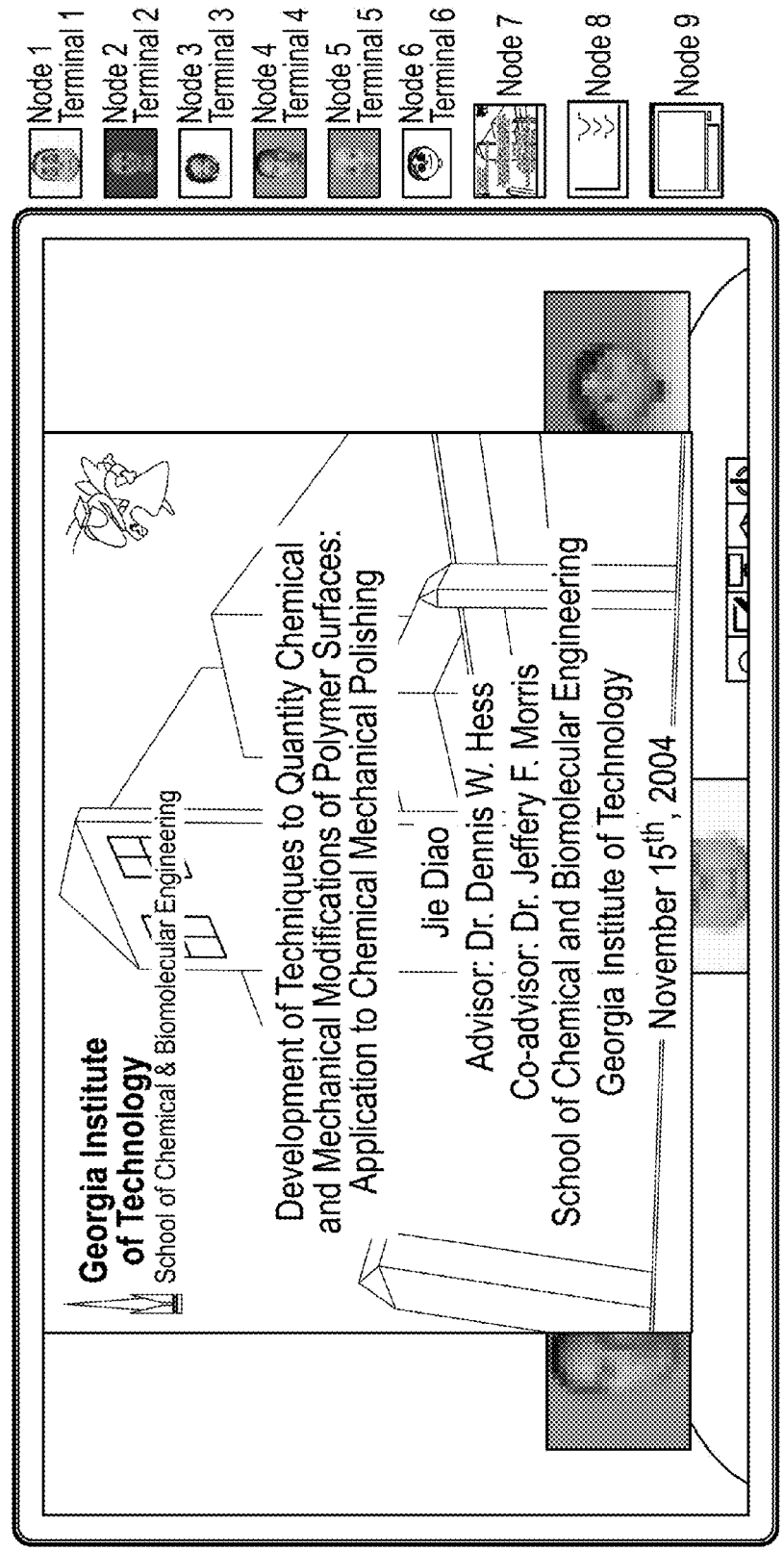

FIG. 3A-3C are examples of what may be shown on the video input and output device at terminal 30-1 of FIG. 2A/B/C, as viewed by participant 1 during a conference. The video input and output device may include a display device 5, such as a computer display or a display of a mobile phone, tablet, etc. The display device is capable of displaying images. An "image" may include a video, a photograph, or a data file that is being shared in the conference (e.g., PowerPoint™ presentation slides, or notes written on an electronic white board).

All the screens shown in FIG. 3A-3C include a virtual conference window in a state of mono-presence. The virtual conference window includes images of the nodes in the conference and control buttons that allow participants to realize certain functions of the virtual conference (for example, sharing a screen, uploading presentation slides, logging out of the conference, etc.).

In FIG. 3A-3C, participant 1 is the host participant since participant 1 is at terminal 30-1. A "host participant" is a conference participant who is viewing other conference participants on his display device. Participants 2-6 are peer participants. A "peer participant" is a conference participant who is not the host participant. Also, a "peer participant," as used herein, will refer to a human participant, and is to be distinguished from an inanimate object (such as a projection screen).

As previously described, a node is a logically independent entity in the virtual conference system 10, and each node can represent a different entity. Referring to FIG. 3A-3C, nodes 2-6 correspond to the peer participants (participants 2-6, respectively), node 7 corresponds to a projection screen, node 8 corresponds to a white board and node 9 corresponds to a chat window. Node 1's own image is displayed at the bottom of the virtual conference window.

A host participant may select a node in the virtual conference window as an active node, for example by clicking on or touching the image corresponding to the node. An "active node," as used herein, corresponds to a node that the host participant is focusing attention on. After a node has been selected as an active node, the image of the selected node is presented at a high image quality. Images of all other nodes will either be hidden or displayed at a low image quality. The images of nodes other than the active node have such low quality that they are not able to generate enough interest for ordinary human beings to focus attention on. This will make the active node in effect the only source in the virtual conference window that the host participant may focus attention on. If the host participant wants to switch attention to a second node, the host participant will have to select the second node as active node so that the second node can be presented at a high image quality. The previous active node will lose its active node status and will be hidden or presented at a low image quality. A node is said to be "activated" if it is selected as an active node and "deactivated" if it loses its active node status and becomes hidden or displayed at a low image quality.

In the example of FIG. 3A, participant 1 has not selected any node as an active node. Node 8 and node 9 are hidden and not displayed in the virtual conference window; nodes 2-7 are presented at a low image quality; there is no node presented at high image quality for participant 1 to focus attention on.

In the example of FIG. 3B, participant 1 has selected node 6 as the active node. As a result, node 6 is presented at a high image quality; nodes 2-5 and 7 are displayed at a low image quality; node 8 and node 9 are hidden and not displayed in the window. If participant 1 wants to switch attention to another node, say, node 7, participant 1 will have to select node 7 as the active node so that node 7 can be brought to front at a high image quality, as shown in FIG. 3C. When node 7 is selected as the active node, node 6 loses its active node status and is deactivated and is displayed at a low image quality.

A virtual conference window will be referred to as "attention-inactive" if no node in the virtual conference is selected as an active node, as in FIG. 3A. When a virtual conference window is attention-inactive, the virtual conferencing system will regard the host participant as not focusing attention on any of the nodes. This attention information will remain accurate whether the virtual conference window is in a state of mono-presence, poly-presence or absence.

A virtual conference window will be referred to as "attention-active" if a node in the virtual conference is selected as an active node, as in FIGS. 3B and 3C. When a virtual conference window is attention-active, the virtual conferencing system will regard the host participant as focusing attention on the active node. This attention information is accurate when the virtual conference window is in a state of mono-presence. When the virtual conference window is in a state of poly-presence, however, the accuracy of this attention information is questionable because the host participant may focus attention on other competing windows, not necessarily on the active node. When the virtual conference window is in a state of absence, this attention information is inaccurate as the virtual conference window (including the active node) is concealed from the host participant. The accuracy of attention information in different scenarios is summarized in Table 1.

TABLE 1

Accuracy of attention information

| State | Virtual conference window is: | |
| --- | --- | --- |
|  | Attention-active | Attention-inactive |
| Mono-presence | Accurate | Accurate |
| Poly-presence | Can be inaccurate | Accurate |
| Absence | Inaccurate | Accurate |

To address the inaccuracy of attention information arising during virtual conference, following method is proposed.

1) Whenever the virtual conference window is made attention-active, that is, an active node is selected, the virtual conference system should put the virtual conference window in a state of mono-presence (one way to achieve this is to make the virtual conference window run in Full-Screen mode, as enabled by many modern programming languages such as Java and Actionscript).

2) whenever the virtual conference system detects that the virtual conference window may no longer be in a state of mono-presence (for example, when host participant makes the virtual conference window exit the full screen mode or brings another window in front of the virtual conference window), the virtual conference window should be made attention-inactive, that is, any active node should be deactivated.

Programming languages such as Java and Actionscript can notify the system if certain events occur that may indicate the termination of Full-Screen mode. Such events may include but are not limited to out-of-focus, deactivation, exiting full screen, etc. The termination of mono-presence state of the virtual conference window could be initiated by the host participant in numerous ways. For example, the host participant may take the virtual conference window out of the state of mono-presence by pressing ESC on a keyboard, by pressing the home button on a smartphone, by starting another software program that will run in foreground, by pressing ATL-TAB keys to switch to an existing window, etc. The termination of mono-presence state of the virtual conference window could also be initiated by the system if the system does not detect any activity from host participant for some time.

The proposed method ensures that if an active node is selected, no windows outside the virtual conference window will compete for the attention of the host participant as the virtual conference window is guaranteed to be in a state of mono-presence; it also ensures that there will be no active node for the host participant to focus attention on when the virtual conference window is in a state of poly-presence or absence.

Figure 4A:
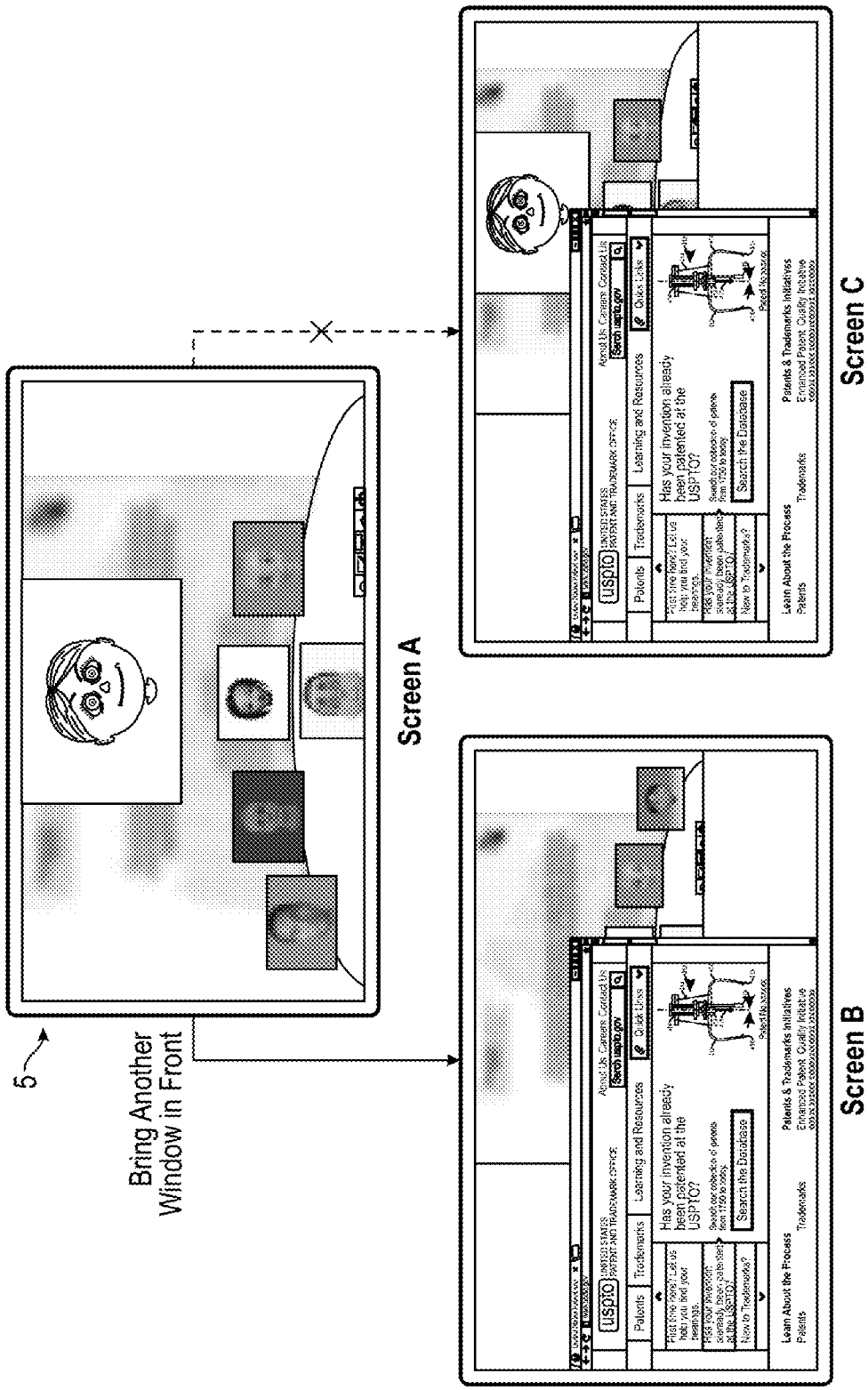

FIGS. 4A and 4B provide an example of the implementation of the method. Assume that the virtual conference window is in a state of mono-presence with node 6 selected as the active node. The screen at terminal 1 will look like screen A in FIG. 4A. When participant 1 brings a web browser window to front (e.g., by pressing ALT-TAB keys), the virtual conference window exits full-screen mode and automatically becomes displayed side by side to the browser window. Instead of keeping node 6 as the active node in the virtual conference window (as shown in screen C in FIG. 4A), the system automatically deactivates node 6 when the virtual conference window exits full-screen mode (as shown in screen B in FIG. 4A). The system will regard the host participant as not focusing attention on any node in the virtual conference. Now assume that the host participant decides to switch attention from the web browser back to node 6 and clicks the blurred image of node 6 in the virtual conference window (as shown in screen B in FIG. 4B). Instead of simply bringing virtual conference window to front with node 6 activated (screen D in FIG. 4B), the system will make the virtual conference window full-screen so that the browser cannot compete with node 6 for the host participant's attention (as shown in screen A in FIG. 4B). The system will regard the host participant as focusing attention on node 6.

Conveying Attention Information with Augmentation

In a virtual conference, conveying attention information to participants presents unique challenges. Ideally, the method of conveying attention information should refrain from bringing too much distraction to participants; it should also pass the information accurately in a natural manner. This disclosure proposes a method that manipulates video images of a peer participant to induce a host participant to infer what the peer participant is focusing attention on.

The method starts with augmenting the image captured by the video input device at a peer participant's terminal, which is referred to as an original image (FIG. 5A), with a virtual table and a virtual screen. Linear perspective, a mathematical system for representing three-dimensional objects and space on a two-dimensional surface, is used to present the virtual table and the virtual screen to create an illusion of space and distance (FIG. 5B). The new image created by augmenting the original image is referred to as an augmented image. In the augmented image, one edge of the virtual table is made shorter to make the host participant think that the edge is further away from the host participant (or closer to the peer participant) than the opposite edge, which is longer. The bottom of the virtual screen is anchored close to the longer edge to make the host participant think that the virtual screen is placed near the longer edge and therefore is closer to the host participant (or further away from the peer participant). This augmented image creates an illusion that the virtual screen is placed in front of the peer participant and induces the host participant to think that the peer participant is looking at the virtual screen. If images or texts that represent what the peer participant is focusing attention on are added to the virtual screen, it will enable the host participant to infer what the peer participant is focusing attention on. For example, in FIG. 5B, the augmented image will enable the host participant to infer that peer participant 4 is focusing attention on peer participant 6.

Although the augmented image can be displayed in place of the original image throughout the virtual conference to convey attention information, the virtual table and virtual screen do occupy significant display area and can become a distraction. For example, in FIG. 5B, the view of the mouth of the peer participant is blocked by the virtual screen. The system can reduce the distraction from the augmented image by displaying the original image as default. When the host participant requests attention information, say, by clicking on the original image, the system may display the augmented image for a predefined amount of time before reverting back to the original image (FIG. 6).

The illusion of space and distance created by the augmentation can be further enhanced. Instead of displaying the original image as default, the system scales up the original image per a predefined scale ratio $S_0$ ($S_0>1$) and crop the scaled-up image to fit the size of the original image. The host participant only sees the part of the scaled-up image after cropping. An image obtained by scaling up an original image per scale ratio x and then cropping the scaled-up image to fit the size of the original image is referred to as a zoom-in original image of scale ratio x; similarly, an image obtained by scaling up an augmented image per scale ratio x and then cropping the scaled-up image to fit the size of the augmented image is referred to as a zoom-in augmented image of scale ratio x. When the host participant requests attention information, say, by clicking on the zoom-in original image, the system will start to create an animation by displaying a sequence of zoom-in augmented images of scale ratio $S_1$, $S_2$, ..., $S_N$ ($S_0 \geq S_1 > S_2 > ... > S_{N-1} > S_N \geq 1$). Each zoom-in augmented images is followed by one with a smaller scale ratio. The animation creates an illusion that the optical lens at the peer participant's terminal is zooming-out and therefore bringing into view things in front of the peer participant that would not have been revealed without the zooming-out. After the animation, the system will continue to display the zoom-in augmented image of scale ratio $S_N$ for a predefined amount of time before reverting back to the zoom-in original image of scale ratio $S_0$. During the reversion, the system displays a sequence of zoom-in augmented images of scale ratio $S_N$, $S_{N-1}$, ..., $S_1$ ($S_0 \geq S_1 > S_2 > ... > S_{N-1} > S_N \geq 1$). Each zoom-in augmented images is followed by one with a larger scale ratio and the zoom-in augmented image with the largest scale ratio $S_1$ is followed by the zoom-in original image of scale ratio $S_0$. The reversion animation creates an illusion that the optical lens at the peer participant's terminal is zooming-in and things like the virtual screen and the virtual table in front of the peer participant gradually disappear due to the zooming-in.

FIGS. 7A, 7B, 7C, 7D, and 7E (collectively referred to as FIG. 7) illustrate how to enhance the illusion of space and distance with the method described above. The original image in FIG. 7A with a width of x and a height of y is no longer displayed as default. Instead, the original image is cropped. The part of the original image after cropping has a width of $x/S_0$ and a height of $y/S_0$ ($S_1>1$). Preferably, the part of the original image after cropping covers the front face of the peer participant. The part of the original image after cropping was scaled up by a factor of $S_0$ to fit the size of the original image (width: x; height: y), resulting in a zoom-in original image of scale ratio $S_0$ (FIG. 7B), which is displayed as default. When the host participant requests attention information, say, by clicking on the zoom-in original image, the system will start to create an animation by displaying a sequence of zoom-in augmented images of scale ratio $S_1$, $S_2$, ..., $S_N$ ($S_0 \geq S_1 > S_2 > ... > S_{N-1} > S_N \geq 1$). For illustration purpose, only three of the images from the sequence are shown in FIG. 7. FIG. 7C is a zoom-in augmented image with scale ratio $S_m$, FIG. 7D a zoom-in augmented image with scale ratio $S_n$ and FIG. 7E a zoom-in augmented image with scale ratio $S_N$ ($S_0>S_m>S_n>S_N=1$). It should be noted that two copies of FIG. 7C and FIG. 7D are shown; the one at the top is used to illustrate what happens when the host participant requests attention information; the one at the bottom is used to illustrate what happens when the augmented image reverts back to the zoom-in original image. It can be seen that only part of the virtual screen is visible in FIG. 7C. As the animation progresses, zoom-in augmented images with larger scale ratio are displayed. In FIG. 7D, most part of the virtual screen and part of the virtual table are visible. The animation ends with FIG. 7E, in which both the virtual screen and the virtual table are brought into view completely. The system will display the zoom-in augmented image of scale ratio $S_N$ (FIG. 7E) for a predefined amount of time before reverting back to the zoom-in original image of scale ratio $S_0$ (following the dotted line, FIG. 7E→7D→7C→7B).

Figure 5A:
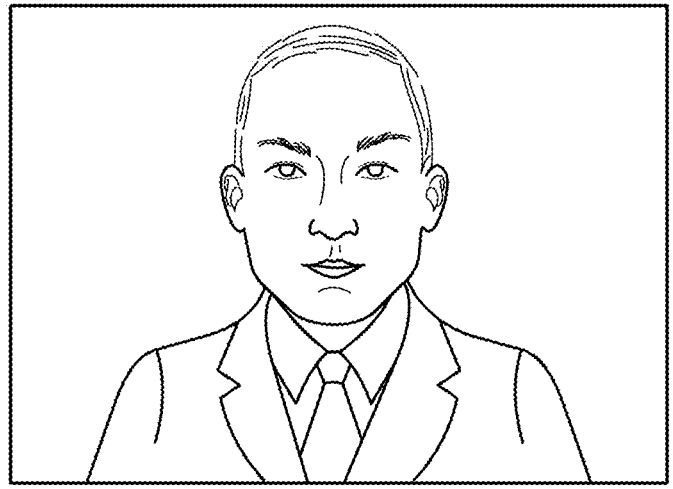
FIGS. 5A and 5B depict an original image and an augmented image.
Figure 5B:
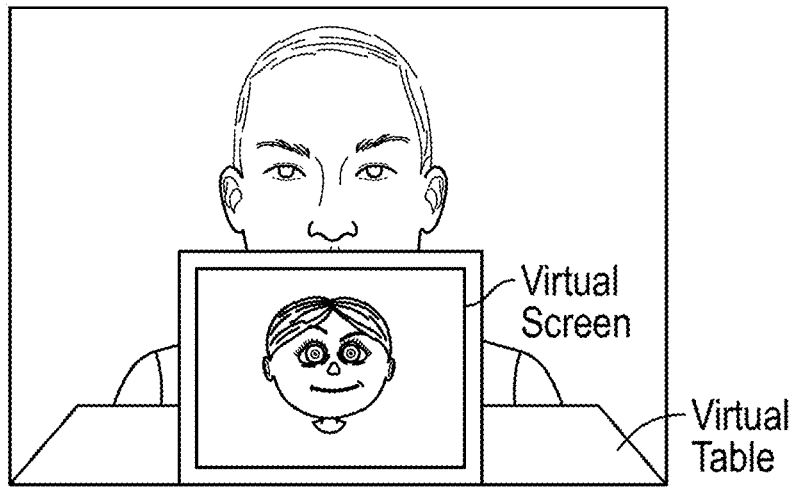

Because FIGS. 5A and 5B (collectively FIG. 5), FIGS. 6A and 6B (collectively FIG. 6), and FIG. 7 are only used to illustrate the concept of cropping, scaling and animating, a single static image is used as a base to produce all the images in FIG. 5, FIG. 6 and FIG. 7. This should not be interpreted as limiting the concept to static images. The concepts illustrated in FIG. 5, FIG. 6 and FIG. 7 are applicable to video images changing from frame to frame. For example, in a virtual conference, the face and body positions of peer participants may be different in FIGS. 7B, 7C, 7D and 7E, but the method used to crop and scale those images and the way to determine the sequence of those images are the same.

As illustrated in FIG. 5B, if a peer participant is focusing attention on a node in the virtual conference, images or texts that represent that node can be added to the virtual screen to enable the host participant to infer that the peer participant is focusing attention on the particular node. If the peer participant is not focusing attention on any nodes in the virtual conference, a blank virtual screen may be shown or texts like "exploring . . . " can be added to the virtual screen to enable the host participant to infer that the peer participant is not focusing attention on any node in the virtual conference. If the peer participant is focusing attention on the host participant, the virtual table and the virtual screen may not even be needed to convey the attention information. When the host participant requests attention information, the system may choose to display texts such as "I am looking at you!" or produce a certain sound to inform the host participant that he is getting the attention of the peer participant. Alternatively, a cartoon figure, such as a red bird, that waves hands at or winks at the host participant, can be displayed in front of or in the vicinity of the peer participant image to convey the message of "I am looking at you!" The texts or the cartoon figure will be made invisible after a predefined amount of time to reduce distraction.

Handling Private and Group Chat Messages

Many virtual conferencing systems allow participants to communicate with each other via both voice and instant messaging (or chat). A host participant can choose to send a chat message to more than one peer participant; the host participant can also direct a chat message to only one peer participant. The chat message in the former case is referred to as a "group chat message" and the chat message in the latter case is referred to as a "private chat message". Many virtual conferencing systems let host participant send and read all chat messages in a chat window, which is part of the virtual conference window.

A chat window can be treated as a node in a virtual conference. When a first participant opens up a chat window to read or type chat messages, the system can regard the first participant as focusing attention on the chat window. If a second participant request attention information of the first participant, the system will notify the second participant that the first participant is focusing attention on a chat window.

Information in a chat window may be presented differently to different host participants. Private chat messages will only be presented to those participants whom the messages are intended for and are not visible to other participants. To a host participant, a chat window that a peer participant is focusing attention on may not look the same as the chat window the host participant sees. This makes chat window special compared to other inanimate nodes such as shared screen, whiteboard and projection screen. Information presented in shared screen, whiteboard and projection screen is usually the same for all participants.

This disclosure proposes a different method to handle private chat messages and group chat messages. A group chat window that shows group chat messages and provide group chat functions will be treated as a node. A private chat window will be created for each peer participant that shows private chat messages between the host participant and the peer participant and provides private chat functions between the host participant and the peer participant. The private chat windows, however, will not be treated as separate nodes. Each private chat window is attached to the corresponding peer participant node and will be displayed side by side with the peer participant node image if the peer participant is activated and if the host participant is engaged in private chat with the peer participant.

Figure 8A:
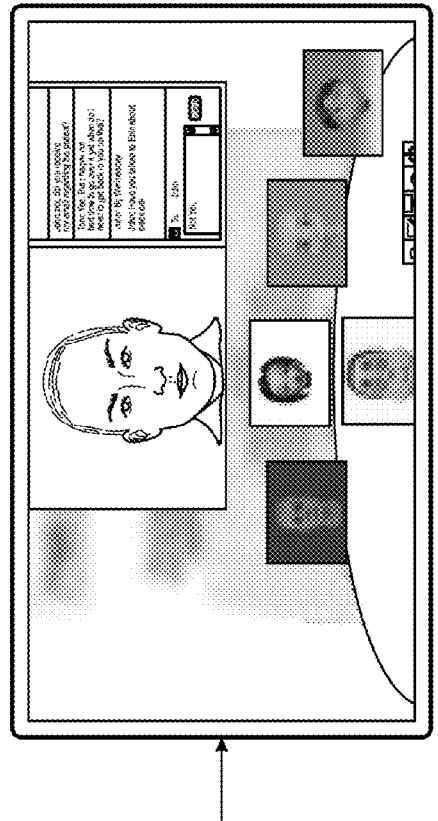
FIGS. 8A, 8B, 8C, and 8D illustrate embodiment that handles private chat messages and group chat messages differently.
Figure 8C:
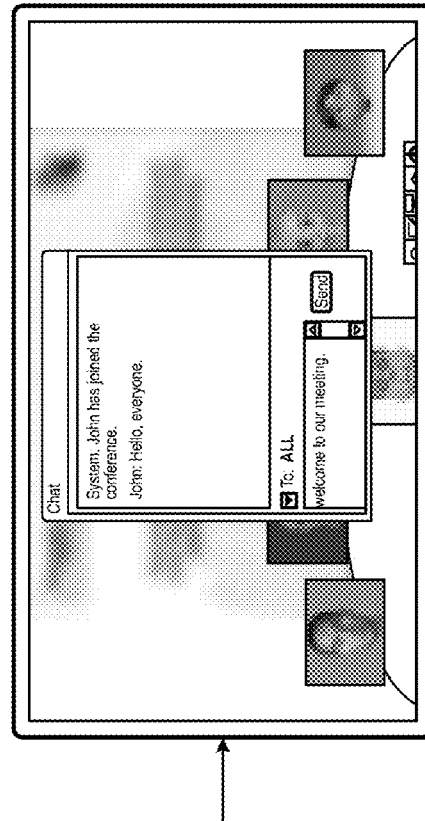
Figure 8B:
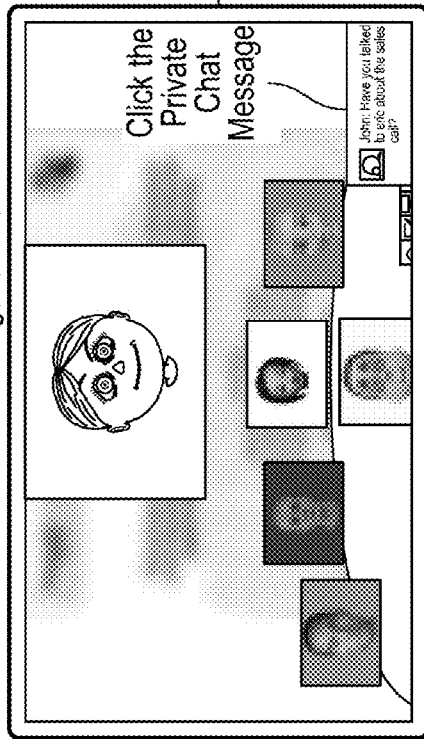

FIGS. 8A, 8B, 8C, and 8D (collectively FIG. 8) illustrate how private chat messages and group chat messages are handled differently. In FIG. 8A, participant 1 is focusing attention on participant 6. A chat message from participant 4 (John) is flashed at the right bottom corner of the screen. The chat message "Have you talked to Eric about the sales call?" is intended for participant 1 only and will only be displayed for a short period. If participant 1 clicks the chat message before it disappears, because the system identifies it as a private chat message from participant 4, node 4 is activated and a private chat window is displayed side by side with the image of node 4 (FIG. 8B). Any message participant 1 sends from the private chat window will be delivered to participant 4 only.

Figure 8D:
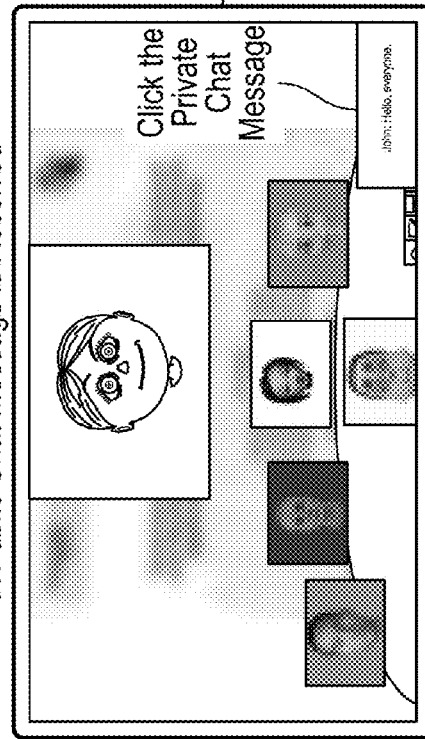

In FIG. 8C, participant 1 is also focusing attention on participant 6. A chat message from participant 4 (John) is flashed at the right bottom corner of the screen. The chat message "hello everyone" is broadcast to the whole group and will only be displayed for a short period. If participant 1 clicks the chat message before it disappears, because the system identifies it as a group chat message, the group chat window node is activated (FIG. 8D). Any message participant 1 sends from the group chat window will be broadcast to the whole group. If participant 1 wants to send a private chat message, he has to activate the node corresponding to the peer participant the private chat message is intended for.

Because attention reflects the concentration of the mind, not just the vision, people may not necessarily look at something when focusing attention on it. A good example is private chat. While a host participant may not be looking at a peer participant when he is engaged in a private chat with the peer participant, his attention is devoted to the peer participant. Attaching private chat window to the corresponding peer participant node helps the system to deliver more accurate attention information.

Signaling Hand Raising in Virtual Conference

Sometimes there is a need to grab the attention of other participants in a virtual conference. In face-to-face meetings, this is usually done by raising hand or standing up. Many existing virtual conferences provide a "raising-hand" button for a host participant to click on. Once the host participant clicks the raising-hand button, the system will notify a particular peer participant or all participants that the host participant has raised his hand. The system may also provide the option for the host participant to cancel hand raising by clicking the same raising-hand button or a different button. The method can be further improved, as described below, to better simulate hand raising process in face-to-face meetings.

In face-to-face meetings, not all hand-raising activities are interpreted as an attempt to grab attention, especially when the hand is only raised for a short period. A good example is an act of raising hand to scratch one's head. Also, a participant need to sustain an effort to keep the hand raised before he lowers the hand. On the contrary, when raising hand during a virtual conference by clicking a "raising-hand" button, the participant does not need to do anything to sustain the "raising-hand" status until he cancels hand raising.

Instead of using button click, this disclosure proposes to use "pressing-and-holding" to signal hand raising. When using a mouse, a participant can realize pressing-and-holding by pressing a mouse button without releasing the button and without moving the mouse; when using a touch screen, a participant can realize pressing-and-holding by applying pressure using a finger or a touch input device such as a stylus against an area on the screen without moving and without releasing the finger or the touch input device. When a host participant wants to raise hand in a virtual conference, the participant needs to do pressing-and-holding against a "raising-hand" button. If the host participant terminates pressing-and-holding within a predefined waiting period, the system will not send notifications that the host participant has raised hand. After the host participant keeps pressing-and-holding longer than the predefined waiting period, the system will notify a particular participant or all participants that the host participant has raised hand. The predefined waiting period after pressing-and-holding is used to avoid sending out notifications when the host participant clicks the raising-hand button by accident. After the raising-hand notification is sent, once the host participant terminates pressing-and-holding, the system will send out notifications that the host participant has lowered hand. The termination of pressing-and-holding can be triggered if the system detects any of the pre-defined events. Such events may include, but not limited to, releasing of the mouse button, moving of the mouse cursor, releasing of the finger or the touch input device, moving of the finger or the touch input device, pressing on a different area of the touch screen, typing on keyboard, a particular participant exiting the conference, an alert window popping out, deactivation of the virtual conference window, etc. The sending of lowering-hand notification upon termination of pressing-and-holding can better simulate the hand raising behavior in face-to-face meetings in which a participant need to sustain an effort to keep the hand raised before he lowers the hand.

Embodiments of the inventive concepts and all of the functional operations described in this specification can be implemented in digital electronic circuitry, or in computer software, firmware, or hardware, including the structures disclosed in this specification and their structural equivalents, or in combinations of one or more of them. The central server can be implemented as a combination of computer hardware including a processor and a memory with one or more computer program products, i.e., one or more modules of computer program instructions encoded on a computer-readable medium for execution by, or to control the operation of, data processing apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction among terminals 30, embodiments can be implemented using a computer having a display device, e.g., a CRT (cathode ray tube), LCD (liquid crystal display), projection screen, OLED display, 3D display, etc. for displaying information to the participants. A keyboard and a pointing device, e.g., a mouse or a trackball, by which a conference participant can provide input to the computer are also provided. Other kinds of devices can be used to provide for interaction with participants as well; for example, feedback provided to the player can be any form of sensory feedback, e.g visual feedback, auditory feedback, or tactile feedback; and input from the player can be received in any form, including acoustic, speech, brain waves, other physiological input, eye movements, gestures, body movements, or tactile input. For example, any of the above methods may be used to make a "selection."

Embodiments can be implemented in a computing system that includes a back-end component, e.g., as the central server 20, or that includes a middleware component, e.g., an application server, or that includes a front-end component, e.g., a computer at a terminal 30 having a graphical player interface or a Web browser through which a player can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The virtual conferencing system can include clients and servers. A client and server are generally remote from each other and typically interact through a communication network. In the example embodiments presented above, the terminals 30 may be a type of "client." The relationship of client and server arises by virtue of computer programs running on the respective computers and having a client-server relationship to each other.

While this specification contains many specifics, these should not be construed as limitations on the scope of the invention or of what can be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

It should be understood that the invention can be practiced with modification and alteration within the spirit and scope of the appended claims. The description is not intended to be exhaustive or to limit the inventive concept to the precise form disclosed. It should be understood that the inventive concept can be practiced with modification and alteration.

What is claimed is:

1. A computer-implemented method of executing a virtual conference among a plurality of nodes including a first node, wherein there is a display device associated with the first node that is configured to display a virtual conference window containing images of participants at other nodes of the plurality of nodes, the method comprising:
    displaying the virtual conference window in a state of mono-presence in response to receiving a selection in the virtual conference window, wherein the displaying of the virtual conference window in a state of mono-presence triggers a process of identifying one of the nodes as an attention recipient and displaying the attention recipient's image differently than images of other nodes; and
    deactivating the virtual conference window in response to receiving a selection in another window, wherein the deactivating of the virtual conference window stops the process of identifying an attention recipient.

2. The computer-implemented method of claim 1, further comprising causing the virtual conference window to be automatically displayed in full-screen mode in response to receiving the selection.

3. The computer-implemented method of claim 1, wherein the selection is an input to the virtual conference window.

4. The computer-implemented method of claim 1 further comprising deactivating the virtual conference window in response to the virtual conference window exiting a full-screen mode, wherein the deactivating of the virtual conference window stops the process of identifying an attention recipient.

5. The method of claim 1, wherein at least one of the images of participants comprises a private chat window.

6. The method of claim 5, wherein the private chat window and an associated image of a participant are displayed in response to receiving a selection of private chat window.

7. The method of claim 1, wherein at least one of the plurality of nodes comprises a group chat window.

8. The method of claim 1, wherein identifying one of the nodes as an attention recipient comprises identifying a second node of the plurality of nodes that the first node is in a private chat with, and making the second node the attention recipient.

9. The method of claim 1 further comprising:
    augmenting an original image of the attention recipient by changing a dimension of the original image to create an augmented image; and
    displaying the augmented image of the attention recipient in response to receiving the selection.

10. A computer-implemented method of executing a virtual conference among a plurality of nodes including a first node, wherein there is a display device associated with the first node that is configured to display a virtual conference window containing images of participants at other nodes of the plurality of nodes, the method comprising:
    displaying, on the display device, a private chat window with an image of a participant that is associated with the private chat window in response to receiving, from the first node, a selection of a private chat window; and
    deactivating the virtual conference window including the private chat window in response to receiving a selection in another window.

11. The method of claim 10 further comprising identifying the participant that is associated with the private chat window as an attention recipient, and displaying an image of the participant differently than images of participants at other nodes of the plurality of nodes.

12. The method of claim 10 further comprising displaying the virtual conference window in a state of mono-presence in response to receiving the selection of a private chat window.

* * * * *